M. K. THAYER.
ROTARY INTERNAL COMBUSTION ENGINE.
APPLICATION FILED SEPT. 25, 1916.

1,241,303. Patented Sept. 25, 1917.
3 SHEETS—SHEET 1.

M. K. Thayer,
Inventor

By Geo. P. Kimmel
Attorney

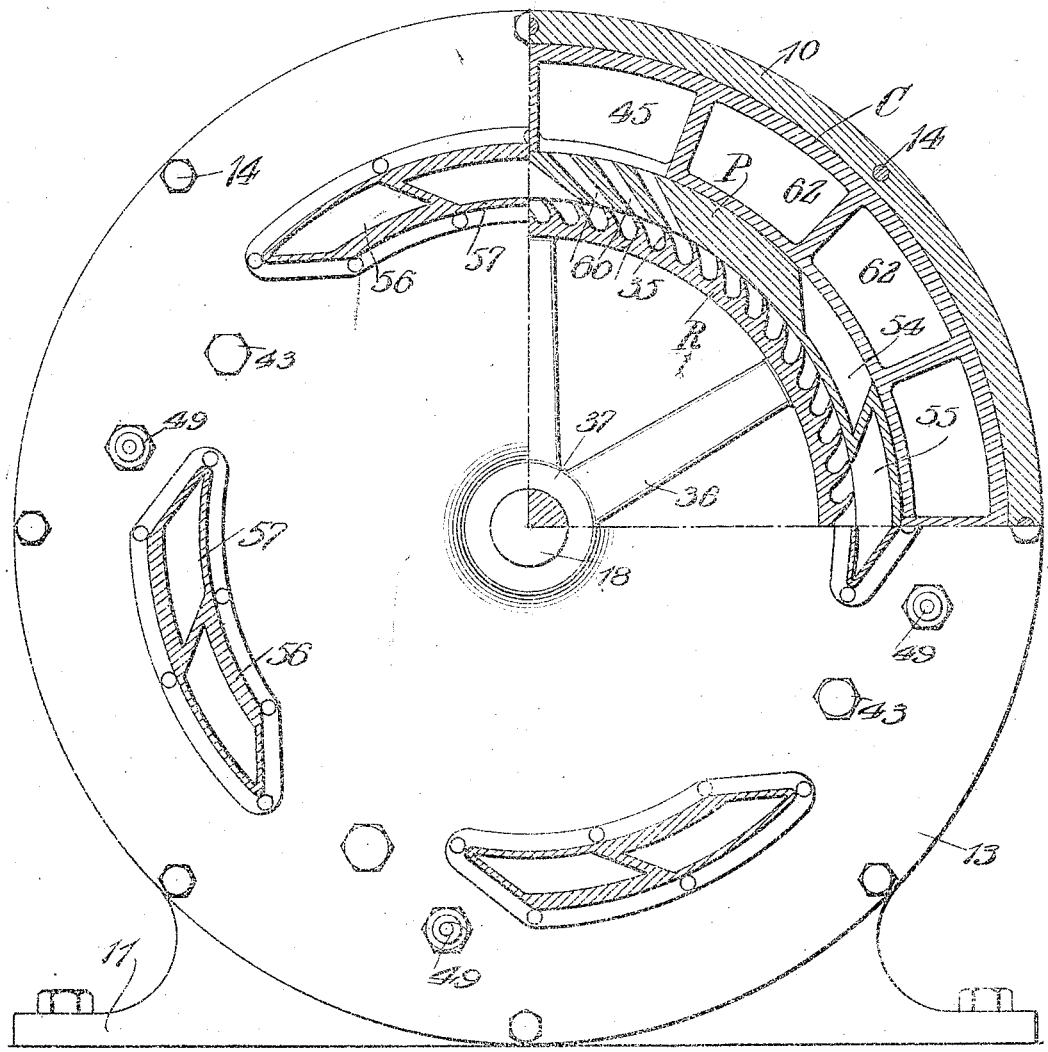

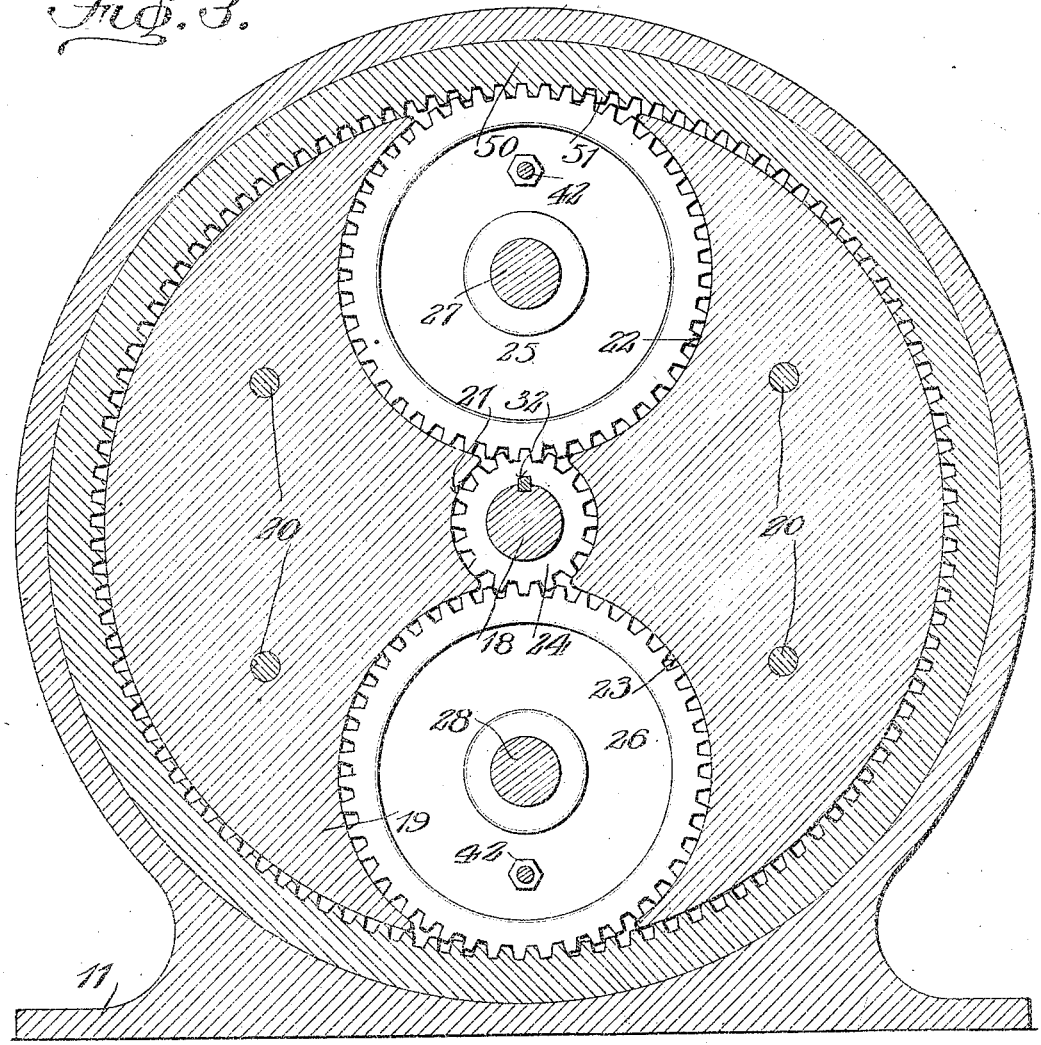

UNITED STATES PATENT OFFICE.

MARSHALL K. THAYER, OF RED ROCK, MONTANA.

ROTARY INTERNAL-COMBUSTION ENGINE.

1,241,303.

Specification of Letters Patent.

Patented Sept. 25, 1917.

Application filed September 25, 1916. Serial No. 122,026.

*To all whom it may concern:*

Be it known that I, MARSHALL K. THAYER, a citizen of the United States, and resident of Red Rock, in the county of Beaverhead and State of Montana, have invented certain new and useful Improvements in Rotary Internal-Combustion Engines, of which the following is a specification.

The present invention relates to internal combustion engines and has particular reference to new and useful improvements in rotary engines of this type.

The primary object of my invention is to provide a rotary internal combustion engine which in use produces a continuous non-pulsating torque tending toward a production of greater power, smoother running and more efficient service as well as saving of fuel.

Another object of my invention is to provide a rotary internal combustion engine so constructed that while in operation a series of impulses is given throughout the rotation of the engine.

My invention contemplates the provision of an internal combustion engine unit adapted for operation in conjunction with similar units, the various units having their explosive periods at different intervals to produce continuous non-pulsating revolutions.

A further object of my invention is to provide a rotary internal combustion engine which is simple in construction, strong and durable, cheap to manufacture and efficient in operation, the parts thereof being capable of quick and easy disassemblage for inspection and repair.

A still further object of my invention is to provide a rotary internal combustion engine which will operate as a unit as readily as with a series of the same.

Other objects and advantages to be derived from the use of my improved rotary internal combustion engine will appear from the following detail description and the claims, taken with an inspection of the accompanying drawings, in which:

Fig. 2 is an end elevational view of the same, a portion thereof being broken away and in section;

Fig. 3 is a transverse sectional view taken on the line 3—3 of Fig. 1.

Figure 1:
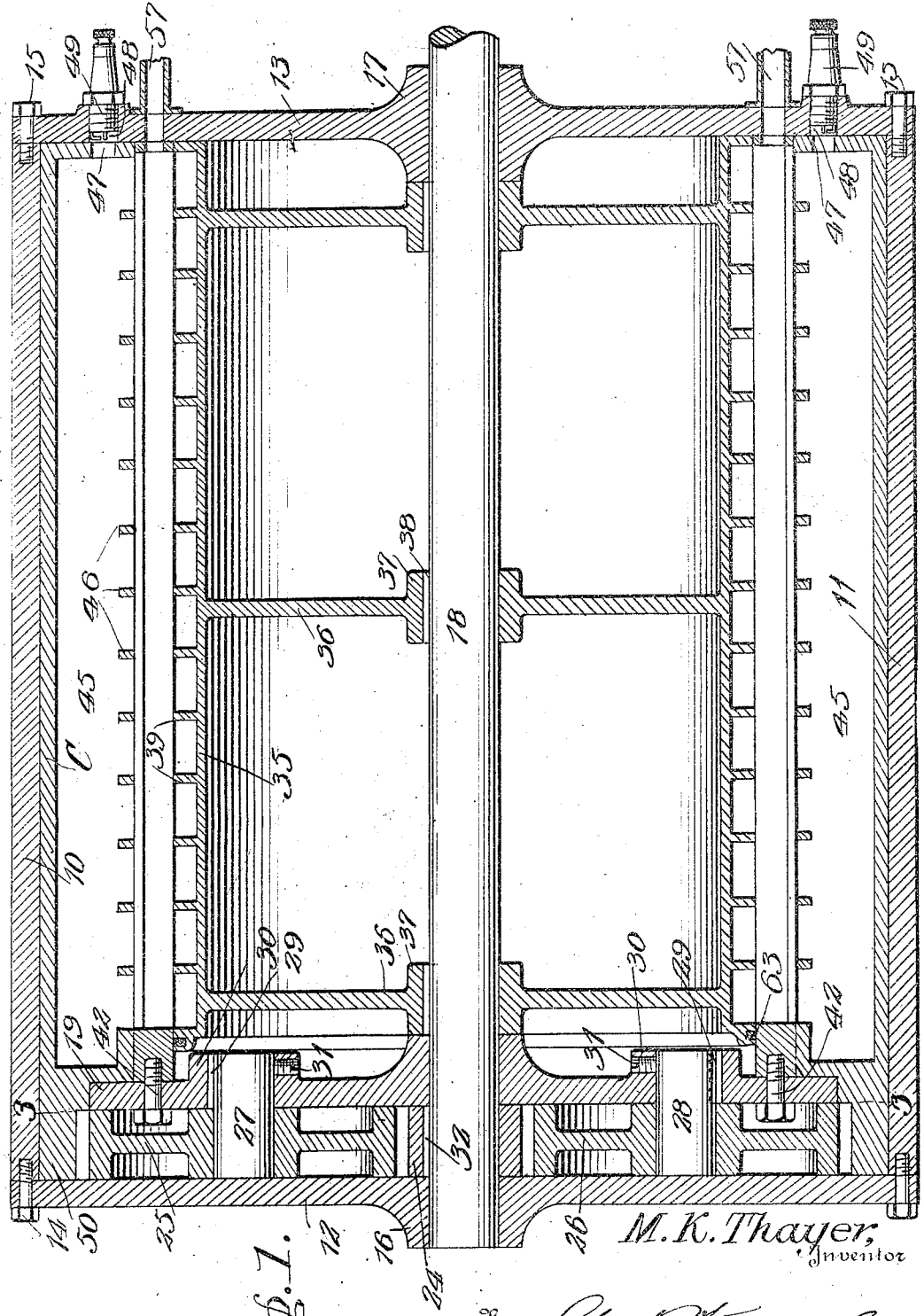
Figure 1 is a longitudinal sectional view of a rotary internal combustion engine embodying the improvements of my invention.

Referring more particularly to the drawings, wherein similar characters of reference designate like and corresponding parts throughout the various views, 10 designates a cylindrical casing or housing in which is mounted the operating parts of my improved engine, said housing having a base 11. The housing 10 is provided with end walls 12 and 13 and connected thereto by means of bolts 14 and 15. The end walls or plates are provided with bearings 16 and 17 in which is journaled the power shaft 18.

A gear carrying plate 19 is mounted on the inner surface of the plate 12 by means of bolts 20 or the like, said gear plate being provided with recesses 21, 22 and 23, said recesses being of sizes to accommodate the pinion 24 and gear wheels 25 and 26, respectively. The gears 25 and 26 are mounted on trunnions 27 and 28 keyed at 29 in enlargements 30 formed in said plate 19. Set screws 31 prevent longitudinal movement of the trunnions. The pinion 24 is keyed as at 32 to the shaft 18, said pinion being in meshing engagement with the gears 25 and 26 to drive the same.

In the internal combustion engine of my invention there are two rotating elements and two stationary elements, one of the former being the rotor R which receives the impact of the explosion and the other being the charge carrying device designated C in its entirety. The one stationary element is the casing 10 and the other the explosive directing plate P, so designated in its entirety. The rotor R is cylindrical and is provided with a plurality of impact receiving blades 35 on the outer peripheral surface thereof. The rotor R is supported on and rotatable with the shaft 18 by means of the spiders 36, the hubs 37 of which are keyed as at 38 to said shaft. A plurality of strengthening webs 39 are disposed at intervals on the rotor R between the impact receiving blades 35 for strengthening said blades.

The explosive directing plate P is interposed between the blades of the rotor and the charge carrying element C, said plates being stationarily mounted by means of bolts 42 extending through the gear plates 19 and connecting into said explosive directing plate. Bolts 43 extending through the end wall 13 serve to support the opposite end of said plate P. The explosive directing plate is provided with a plurality of ports, intake and exhaust, which will be described in detail hereinafter.

The charge carrying element C is provided with a plurality of chambers 45, hereinafter termed combustion chambers, the same having the bottoms thereof open and bridged by a plurality of ribs 46. The end walls of the chambers 45 are provided with apertures 47 adapted to register with apertures 48 formed with the end wall 13, said apertures 48 carrying the spark plugs 49. Any suitable current distributing element may be associated with the engine for properly energizing the spark plugs to produce ignition.

Motion is imparted to the charge carrying element C by means of the gears 25 and 26, an annular flange 50 being formed on one end of said charge carrying device, said flange being provided with interior teeth 51 arranged in meshing engagement with the gears 25 and 26. Thus it will be seen that when the shaft 18 is rotating the pinion 24 carried thereby will impart motion to the gears 25 and 26 in opposite directions, the latter in turn imparting motion to the charge carrying element C in a direction opposite to the direction of rotation of the rotor R. Of course, the gearing is so timed that the combustion chambers pass the spark plugs or similar igniting devices at the proper time.

The explosive directing plate P is provided with a plurality of intake and exhaust recesses 54 and 55 communicating with the intake and exhaust conduits 56 and 57, of which there are a plurality of pairs arranged on the end plates 13. Attention is directed to the fact that the intake and exhaust conduits are arranged adjacent each other in order that the charge passing through the intake conduits may be pre-heated by the exhaust gases passing through the exhaust conduit. At predetermined intervals the explosive directing plate P is provided with a plurality of charge directing ports 60 inclined and tapered in a direction of travel of the rotor R. In the engine described herewith and shown in the drawings a set of four intake and exhaust conduits have been shown, this corresponding to a four cylinder engine of the ordinary reciprocating type. However, when a plurality of units are employed embodying the structure shown in Figs. 1 to 3 the combustion chambers and rotors of the respective units may be relatively offset so that a continuous torque is produced. The charge carrying element is provided with a plurality of chambers 62 which tend to lighten the same and permit quick cooling of the engine after running.

A packing 63 is carried by the end of the rotor R to prevent the escape of gases and the consequent waste of power.

In operation, an explosive charge is applied to the intake conduit 56 passing to the intake recess 54 formed in the charge directing plate P. A suitable pump is provided (not shown) for compressing the charge. As the chamber 45 passes over the intake 54 a portion of the charge is delivered thereto. When the chamber 45 reaches the aperture 60 the openings 47 and 48 register and the spark plug is energized to ignite the charge. When this occurs the explosion acting through the aperture 60 upon the blade 35 of the rotor R causes rotation of the latter. This rotation is imparted in an opposite direction, to the charge carrying element C by means of the gears 25 and 26 and pinion 24. The operation described in the foregoing takes place at four separate places in an engine embodying the structure as shown in the drawings, but of course, it is to be understood that any number of the explosive chambers may be provided and may be arranged in any relation desired. I desire to lay particular stress upon the novel arrangement of the oppositely rotating elements R and C as well as the stationary plate P, these elements entirely obviating the necessity of any spring operated valves, piston valves, or in fact any other type of valves, the plate P being essentially the only valve in the engine. The relative positions of the intake and exhaust ports as well as the positions of the charge directing ports in the plate P render the use of the engine more practicable than the existing types of rotary combustion engines. When two units or more are used there can be no dead-center on the engine. By dead-center, I mean of course, a point at which no explosion could occur without turning over the engine. This is not necessary when two or more units are used, the engine being practically self-starting. I do not lay any particular stress upon the details of construction of my improved engine, since it will be readily seen that the principal features of the same reside in the plate P and the oppositely rotated power producing elements C and R. Any approved mechanism might be employed for imparting motion to the elements in opposite directions and therefore I do not desire to be limited to the use of the gears as shown. Such details of construction may be changed when reducing the device to actual practice.

I desire to further direct attention to the fact that if desired the charge carrying device and rotor may rotate in the same direction by reversing the angles of the charge directing ports. If necessary another set of exhaust ports may be provided to allow the pressure to become normal and to thoroughly remove dead gases. Also any number of combustion chambers may be provided, the provision of a greater number lessening the necessary speed of the element C.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a rotary internal combustion engine, the combination of a casing, a charge directing stationary plate therein, a charge carrying element and a rotor arranged on said plate and revolving in opposite directions thereabout, and said plate being provided with intake and exhaust ports.

2. In a rotary internal combustion engine, the combination of a casing, a charge directing stationary plate therein, a charge carrying element and a rotor rotatable about said plate, said charge carrying element having a plurality of combustion chambers, said plate having charge directing ports for communication with said combustion chambers, at times, and said plate also having intake and exhaust ports.

3. In a rotary internal combustion engine, the combination of a casing, a rotor therein, a plate having charge directing ports and intake and exhaust ports, a charge carrying element formed with combustion chambers rotatable about said plate in a direction opposite to that of the rotor, said combustion chambers alternately registering with intake and charge directing ports to drive the rotor.

4. In a rotary internal combustion engine, the combination of a casing, a charge carrying device rotatable in said casing, a stationary cylindrical charge directing plate concentrically arranged within the casing, and a rotor concentrically arranged within the casing and within said plate, said rotor and charge carrying element rotating in opposite directions on opposite sides of said charge directing plate for the purpose specified.

5. In a rotary internal combustion engine, the combination of a casing having end walls, bearings in said end walls, a shaft in said bearings, a rotor carried by said shaft and provided with a plurality of blades, a charge carrying element rotatable within said casing and having a plurality of combustion chambers therein, a stationary cylindrical plate mounted within the charge carrying device, the latter rotatable thereabout, gearing for imparting motion from said rotor shaft to said charge carrying element, said rotor and charge carrying element rotating in opposite directions, said charge directing plate having a plurality of ports therein for affording communication between the combustion chambers, at times, and said rotor, means for igniting the charge within said combustion chamber when the latter is in communication with the rotor, and intake and exhaust conduits associated with said charge directing plate.

In testimony whereof, I affix my signature hereto.

MARSHALL K. THAYER.